United States Patent
Bonikowsky

[11] 3,758,153
[45] Sept. 11, 1973

[54] PNEUMATIC SEAT FOR CYCLES

[76] Inventor: Gary Wayne Bonikowsky, c/o Shalom Conference Centre RR2, Schomberg, Ontario, Canada

[22] Filed: Mar. 31, 1972

[21] Appl. No.: 240,160

[52] U.S. Cl............ 297/199, 297/214, 297/DIG. 3
[51] Int. Cl................................................ B62j 1/26
[58] Field of Search................... 297/195, 199, 214, 297/DIG. 3

[56] References Cited
UNITED STATES PATENTS

| | | | |
|---|---|---|---|
| 630,266 | 8/1899 | Perry | 297/199 |
| 750,571 | 1/1904 | Berger | 297/199 X |
| 578,900 | 3/1897 | Plew | 297/199 |
| 718,850 | 1/1903 | Kruseman | 297/199 |
| 2,173,224 | 9/1939 | Bergwell | 297/199 |
| 3,146,024 | 8/1964 | Timms | 297/195 |

Primary Examiner—James T. McCall

[57] ABSTRACT

In a seat for cycles, it is most commonly known to have a resilient, porous foam cushion supported by a rigid base and usually protected by a durable weatherproof and chemical resistant fabric covering, the degree of firmness of the seat being inherently constant and dictated by the density and thickness of the foam. In this invention, a flexible, durable, weatherproof and chemical resistant non-porous molded upper shell is bonded to a rigid or semi-rigid underside portion having an air valve, so as to form a cushion assembly enclosing an inflatable, airtight cavity which rests on a rigid supporting base. With this invention, the degree of firmness of the seat may be adjusted to suit individual comfort requirements by increasing or decreasing the air pressure within the cushion assembly cavity by way of the air valve. Moreover, due to the ideal for-mentioned properties of the molded upper shell, the need for a protective durable fabric covering is eliminated. The cushion assembly may be hinged on the supporting base to raise or have similar accomodation for convenient access to the air valve.

1 Claim, 8 Drawing Figures

PNEUMATIC SEAT FOR CYCLES

This invention relates to a seat for cycles.

It is common in cycle seats to have a resilient, porous foam cushion of elongated form supported by a rigid base and usually protected by a durable weatherproof and chemical resistant fabric covering. "One such type, as used in motorcycles is known as a "dual seat", and is of sufficient length to permit a large variation in posture and position of the rider, and may accommodate two riders seated in tandem". However, since the degree of firmness of a seat of this type is inherently constant and dictated by the density and thickness of the foam, there can be little concession made in standardized mass production for personal preference in this important area of rider comfort and safety. Another disadvantage is the added cost of upholstering the seat in order to prevent water absorption and deterioration of the vulnerable porous foam from abrasion and exposure to the elements as well as fuel and oil. Moreover, should the fabric covering receive a cut or tear, it is necessary to completely re-upholster the seat in order to restore it to its original appearance.

I have found that these disadvantages may be overcome by eliminating the resilient foam cushion and fabric covering in favour of a flexible, durable, weatherproof and chemical resistant non-porous molded upper shell of sufficient thickness to strongly resist cutting or tearing. This molded upper shell is bonded to a preferably semi-rigid underside closure having an air valve, so as to form a cushion assembly enclosing an inflatable, airtight cavity. Thus, the degree of firmness of the seat may be adjusted to the preference of the individual rider merely by increasing or decreasing the air pressure within the cushion assembly cavity using a bicycle pump or similar device attached to the air valve. This cushion assembly rests on a rigid supporting base which relieves stress under load on the bonded surfaces of the said assembly when in use. Due to the superior toughness, abrasion and chemical resistance and weatherproof properties of the molded upper shell as achieved by presently available moldable material, the need for a protective durable fabric covering is eliminated, therefore reducing the cost of the manufactured product. Moreover, in the unlikely event of the upper shell being punctured, a simple, inexpensive, invisible exterior repair could be made by the same method used for such repairs in tubeless automotive tires or, in the case of a larger cut, an invisible interior repair could be made by the average unskilled person simply by making a small access hole in the underside portion opposite the cut, patching the cut from the inside, and bonding a piece of matching material over the access hole. The rigid supporting base, being an integral part of the cycle and capable of embodying the rear fender and taillight.

In drawings which illustrate embodiments of the invention,

Figure 6:
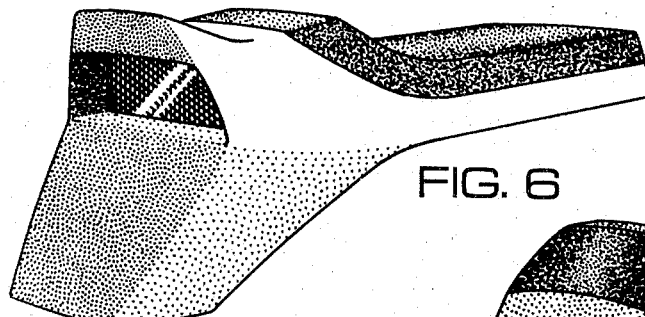
Figure 7:
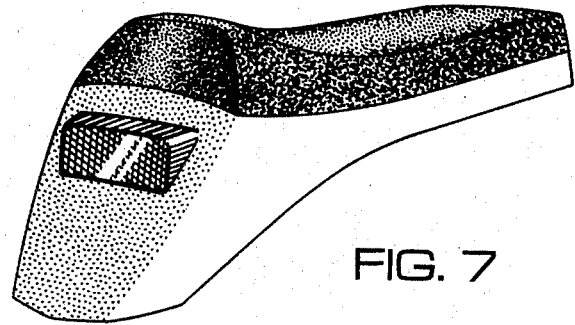
Figure 8:
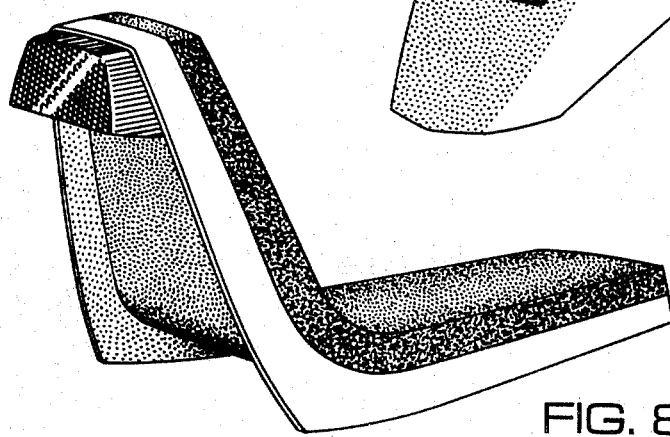

FIGS. 6, 7, and 8 are views of other embodiments having different configurations.

Figure 5:
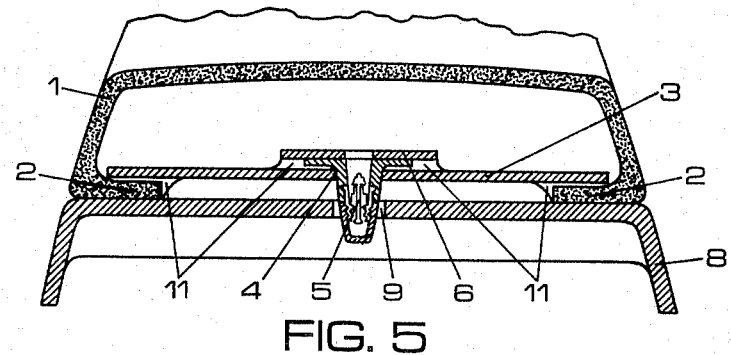
FIG. 5 is a section of the line A—A of FIG. 4.

The seat illustrated comprises of a flexible non-porous molded upper shell 1 having an inwardly extending wall portion around the entire perimeter of its lower edges, as indicated at 2, which is stretched on all sides over a rigid or semi-rigid underside portion 3, the said wall portion 2 being bonded on its inner face to the outer face of the said underside portion 3 around its entire perimeter, so as to form a cushion assembly enclosing an airtight cavity as shown in FIG. 5. To facilitate air pressure adjustment within the cushion assembly cavity, the underside portion 3 has a small hole 4 through which a tightly fitting flanged air valve 5 is inserted, stem outward, prior to the assembly of the said underside portion 3 and the upper shell 1 so that the flange engages, and is bonded to, the inner face of the said underside portion 3 around the perimeter of the said hole 4. The air valve 5 may be reinforced on the inside by a washer 6 which has a larger outside diameter than the air valve flange upon which it sits, being bonded to the inside face of the underside portion 3 around the perimeter of the said flange.

Figure 1:
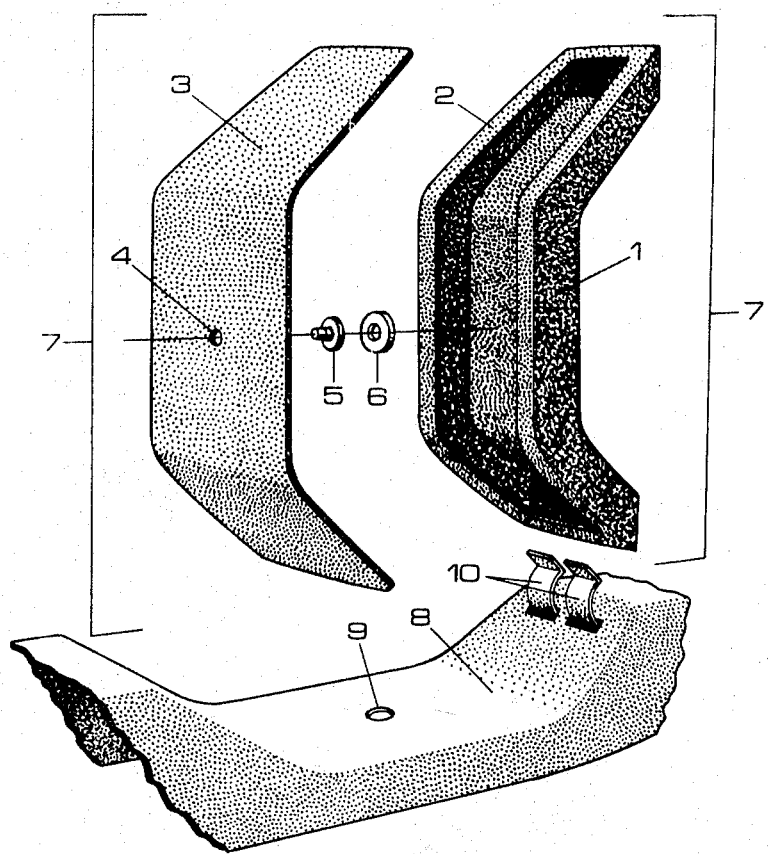
FIG. 1 is an exploded view of one embodiment.
Figure 2:
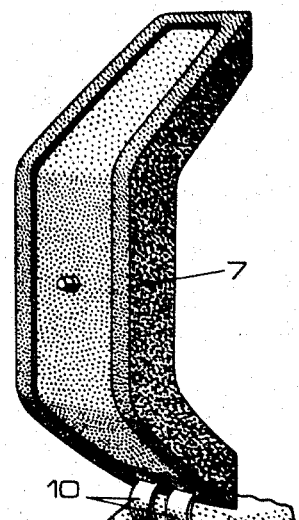
FIG. 2 is an assembled view of this embodiment in a raised position.
Figure 3:
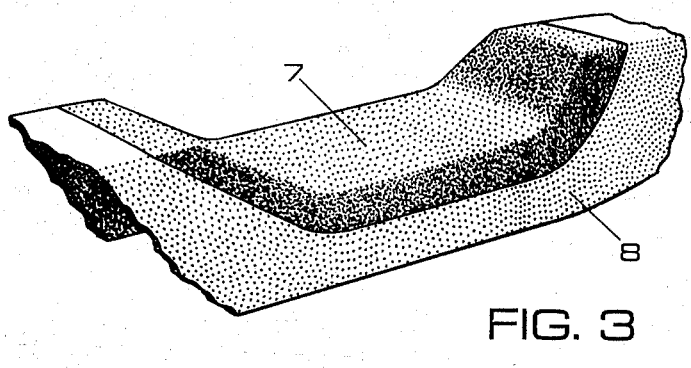
FIG. 3 is an assembled view of this embodiment in a normal riding position.
Figure 4:
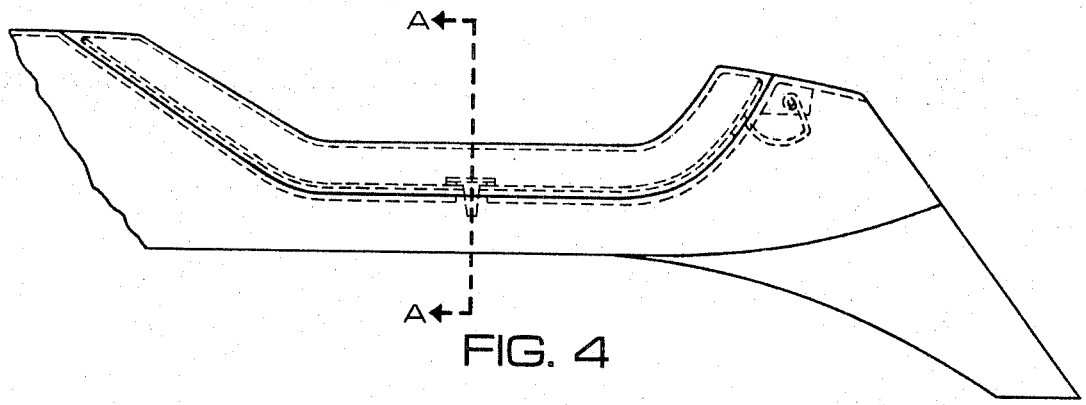
FIG. 4 is a side elevation view of this embodiment.

The complete cushion assembly 7, as shown exploded in brackets in FIG. 1 and assembled in FIG. 2, rests as shown in FIG. 3 on a rigid supporting base 8 having a hole 9 or similar clearance for the air valve stem and also having hinges 10 to which the cushion assembly 7 is attached to raise as shown in FIG. 2, or similar accommodation for convenient access to the air valve 5. All bonded areas of the cushion assembly 7 are indicated at 11 in FIG. 5.

In the embodiments shown in FIGS. 6, 7, and 8, the versatility in configuration possible with this invention are shown. "It will be evident to one skilled in the art that the air valve 5 may be appropriately relocated, including attachment by molding with, or bonding to, the upper shell".

The embodiments of the invention in which an exclusive property or privilege is claimed are defined as follows:

1. An inflatable elongated seat, for use with cycles such as motorcycles carrying thereon a rigid seat-receiving base structure, comprising a flexible inflatable cushion having an upper shell portion of impermeable molded construction with a wall portion extending downwardly therefrom, having an inturned edge, an underside shell closure positioned within said shell and attached in overlying air-sealing relation to the periphery of said wall portion to enclose an air space therewith, valve means connecting with the interior of said air space to permit selected inflation thereof, and securing means attaching said seat to said base structure in substantial conforming supported relation therewith and having said peripheral wall portions positioned in sandwiched relation between said closure portion and said supporting base sructure, to permit ready separation between said cushion and said base when not in use whereby in use loads imposed on said seat by a rider are transferred in distributed relation to said base at least in part through said peripheral wall portion while permitting convenient access beneath the seat by displacement of said seat therefrom when not in use.

* * * * *